United States Patent [19]

Marino et al.

[11] Patent Number: 5,740,139
[45] Date of Patent: Apr. 14, 1998

[54] MAGNETICALLY SUSPENDED OPTICAL RECORDING ACTUATOR

[75] Inventors: Philip F. Marino; Charles J. Simpson, both of Rochester, N.Y.

[73] Assignee: Eastman Kodak Company, Rochester, N.Y.

[21] Appl. No.: 694,974

[22] Filed: Aug. 9, 1996

[51] Int. Cl.⁶ .................................... G11B 7/095
[52] U.S. Cl. ................ 369/44.32; 369/54; 369/44.14
[58] Field of Search .................... 369/44.14–44.16, 369/44.17, 44.18, 44.21, 44.22, 44.25, 44.29, 44.32, 44.35, 54; 359/813–814, 823–824

[56] References Cited

U.S. PATENT DOCUMENTS

| | | | |
|---|---|---|---|
| 4,561,081 | 12/1985 | Janssen et al. | 369/44.17 |
| 4,799,766 | 1/1989 | Estes | 350/352 |
| 5,289,442 | 2/1994 | Van Rosmalen | 369/44.22 |
| 5,412,640 | 5/1995 | Fuldner et al. | 369/44.32 X |

*Primary Examiner*—W. R. Young
*Attorney, Agent, or Firm*—Raymond L. Owens

[57] ABSTRACT

An optical actuator is disclosed which includes a base, a moveable lens holder including an objective lens and positioned relative to the base, and at least six planar magnetic coils and a plurality of magnetic assemblies arranged to be associated with the coils, each of the assemblies including magnets having two or more poles fixed to the actuator base, the coils and the magnets being mounted relative to each other on the lens holder and the base. The actuator includes circuitry for applying signals to the coils to induce magnetic fields in the coils for positioning the lens holder and detectors for providing signals representing the four degrees of freedom of positions of the lens holder with respect to the base. A computational circuitry responsive to the detectors determines the coil signals for positioning the moveable lens holder in six degrees of freedom of motion relative to the base.

6 Claims, 3 Drawing Sheets

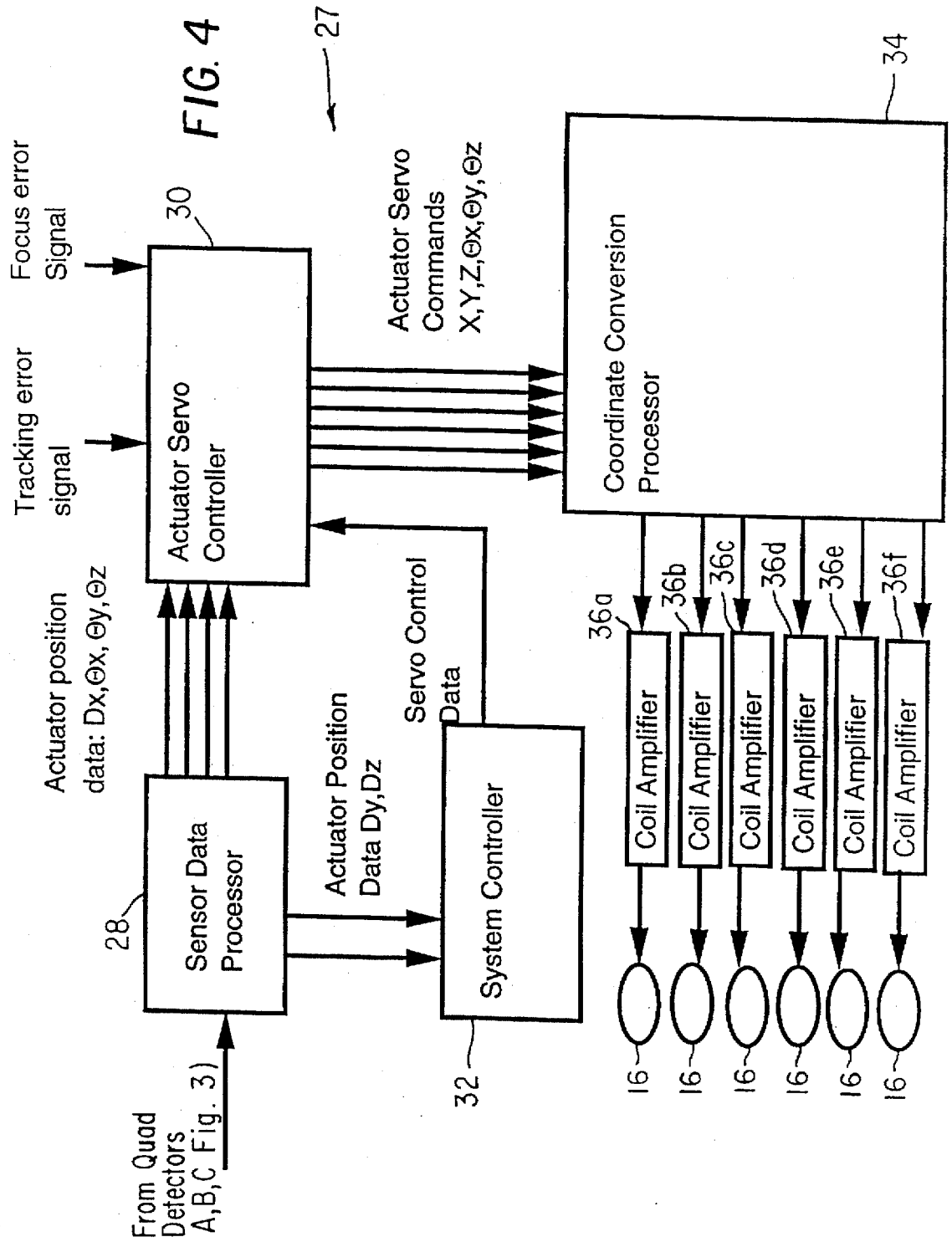

MAGNETICALLY SUSPENDED OPTICAL RECORDING ACTUATOR

CROSS-REFERENCE TO RELATED APPLICATIONS

Reference is made to commonly-assigned U.S. patent application Ser. No. 60/005,396, filed Oct. 6, 1995, entitled "Actuator With Single Surface-Field Motor" by Marino et al, commonly-assigned U.S. patent application Ser. No. 08/656,655 filed May 31, 1996, entitled "Actuator With Single Surface-Field Motor" by Marino et al and commonly-assigned U.S. patent application Ser. No. 08/660,568, filed Jun. 7, 1996, entitled "Position Sensing For An Optical Recording Actuator", by Marino et al, the teachings of which are incorporated herein.

FIELD OF THE INVENTION

The invention relates generally to the field of actuators for storage devices, and more specifically, to the invention relates to actuators requiring no mechanical suspension.

BACKGROUND OF THE INVENTION

Optical disc recording devices typically use focus/tracking actuators to control the lens position relative to the rotating disc. This is necessary because of unavoidable warp of the disk, spindle errors, and other mechanical and optical imperfections. Both focus (controlled by the distance between the lens and the disc surface) and tracking (the correct radial position of the lens so as to read or write a single track at a time) must be simultaneously maintained. The motions of the actuator are controlled by a servo system and the forces which cause these motions are typically generated by one or more electromagnetic motors.

As optical disc recording and reading devices increase in speed (read and write rate), the disc rotational velocity increases. This requires that the focus/tracking actuator, which controls the objective lens position so as to maintain proper focus and tracking location of the read/write spot on the disc surface, must respond more quickly and accurately to any disc warping or spindle errors. This in turn requires that any internal actuator resonances be sufficiently high in frequency so as not to prevent the required control system performance.

Current actuators generally use magnetic motors to control the actuator motion in two directions: focus (generally vertical) and tracking (generally lateral, or along a radial direction of the disk). The motion of the actuator in the remaining four degrees of freedom (one translational and three rotational) are typically controlled (passively) by the actuator suspension—usually either a flexure system or a pin and bushing system. These suspension components often result in unwanted actuator resonances that limit actuator performance and make controlling the actuator to the required accuracy and bandwidth more difficult. As writing and reading speeds increase, and the actuator must respond more accurately and at increasingly higher frequencies, these resonances may limit the system speed.

Commonly assigned U.S. Pat. No. 4,799,766 entitled "Objective Lens Support and Positioning System" issued Jan. 24, 1989 to Estes discloses an arrangement for positioning an optical actuator. This arrangement uses magnetic yokes which are fixed to the base and not to the actuator. One permanent magnet is positioned on the lens holder. With this type of arrangement, it is difficult to control the actuator since the magnet itself, which may be quite heavy, has to be moved along with the lens holder.

SUMMARY OF THE INVENTION

It is an object of the present invention to provide an optical actuator having a lens holder that can effectively be positioned in multiple degrees of freedom of motion.

This object is achieved by an optical actuator comprising:
a) a base;
b) a moveable lens holder including an objective lens and positioned relative to the base;
c) at least six planar magnetic coils and a plurality of magnetic assemblies arranged to be associated with the coils, each of the assemblies including magnetic means with two or more poles fixed to the actuator base, the coils and the magnetic assemblies being mounted relative to each other on the lens holder and the base;
d) means for applying signals to the coils to induce magnetic fields in the coils for positioning the lens holder;
e) detector means for providing signals representing the four degrees of freedom of positions of the lens holder with respect to the base; and
f) computation means responsive to the detector means signals for determining the coil signals for positioning the moveable lens holder in six degrees of freedom of motion relative to the base.

Advantages

In accordance with this invention, the actuator has no mechanical suspension. The weight of the actuator is supported solely by magnetic motors, and the motion of the actuator in all six degrees of freedom is controlled by these motors. The only mechanical connection from the actuator to ground is through the required electrical connections to power the motor coils. These, being non-structural in nature, are designed so as not to produce problematic resonances.

The following are further features of the invention. There are no resonances due to flexures or any suspension. This permits higher control bandwidths with simpler control systems, further permitting higher system recording speeds.

The requirements for precision mechanical parts are reduced. No high precision flexures or close tolerance pin joints are required.

Actuator lifetime and reliability are improved. There is no mechanical fatigue due to flexing motion or mechanical wear.

Actuator tilt is controllable at all times—both statically and dynamically. This improves system performance.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 4 is as block diagram of a control system in accordance with the present invention.

DETAILED DESCRIPTION OF THE INVENTION

Figure 1:
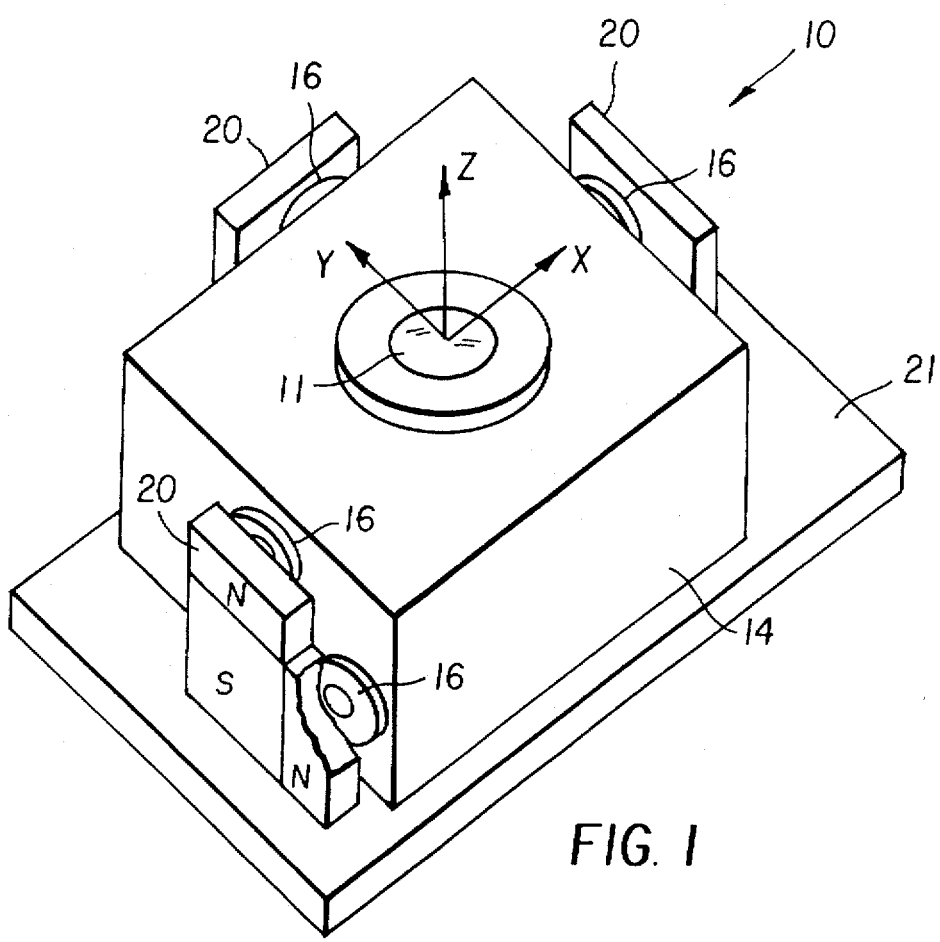
FIG. 1 is an illustration of the magnetically suspended actuator in accordance with the present invention.

Referring to FIG. 1, a schematic of an optical actuator 10 in accordance with this invention is shown. The optical actuator 10 includes an objective lens 11 which is well known in the art and focuses a laser light beam (not shown) on the surface of the disk member (not shown). A lens holder 14 is provided which mounts the objective lens 11. The objective lens 11 can be mounted to the lens holder with adhesives. A plurality of planar magnetic coils 16 are fixed to the lens holder 14. As shown the lens holder 14 is rectangular in shape, and three of the surfaces each contain two of the planar magnetic coils 16. Magnetic assemblies 20 are fixed to a base 21. In this figure, quad photosensitive detectors have been omitted for clarity but will be described in FIG. 3. The motors shown here which comprise the planar magentic coils 16 and magnets are of the flat, multipole type described in commonly-assigned copending application U.S. patent application Ser. No. 08/656,655 filed May 31, 1996 to Marino et al entitled "Actuator With Single Surface-Field Motor."

The optical actuator 10 shown has six coils, only four of which are visible in FIG. 1. Three magnetic assemblies 20 are shown. The magnetic assemblies 20 are shown to include three separate magnets which provide six poles, three of the poles are depicted in the planar magnetic coils 16 as being north, south, and north, respectively. On the opposite face of the magnets, there are three corresponding poles of south, north, and south. This is a preferred embodiment. There are, however, many other combinations of flat, multipole motors which could be used for this purpose. The number of coils can be as few as six, since six independent degrees of freedom must be controlled. However, more than six coils can be used, as two or more coils can be used to control one of the degrees of freedom of motion. It will be understood, depending upon the coil configuration that each magnetic assembly would have two or more poles.

Figure 2:
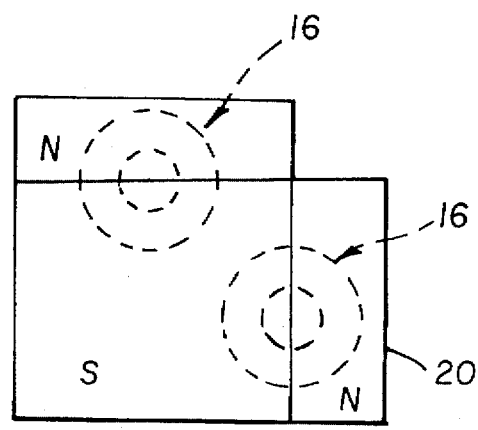
FIG. 2 shows the relationship between motor coils and magnets in one preferred arrangement.

Turning now to FIG. 2, magnetic assemblies 20 is shown to be associated with two separate coils 16. The top coil will be used to control vertical motion, whereas the bottom coil, controls lateral motion. When current is supplied to the coils, as will be described later, the moving current cuts the magnetic flux lines produced by the magnets and provides a force on the actuator holder. The top coil will drive one portion of the lens holder in a vertical direction, while the bottom coil controls the position of the lens holder in the horizontal direction. The other coils operate in similar fashion. As an alternative, the coils can be mounted on the base 21 and the magnets on the lens holder 14.

Figure 3:
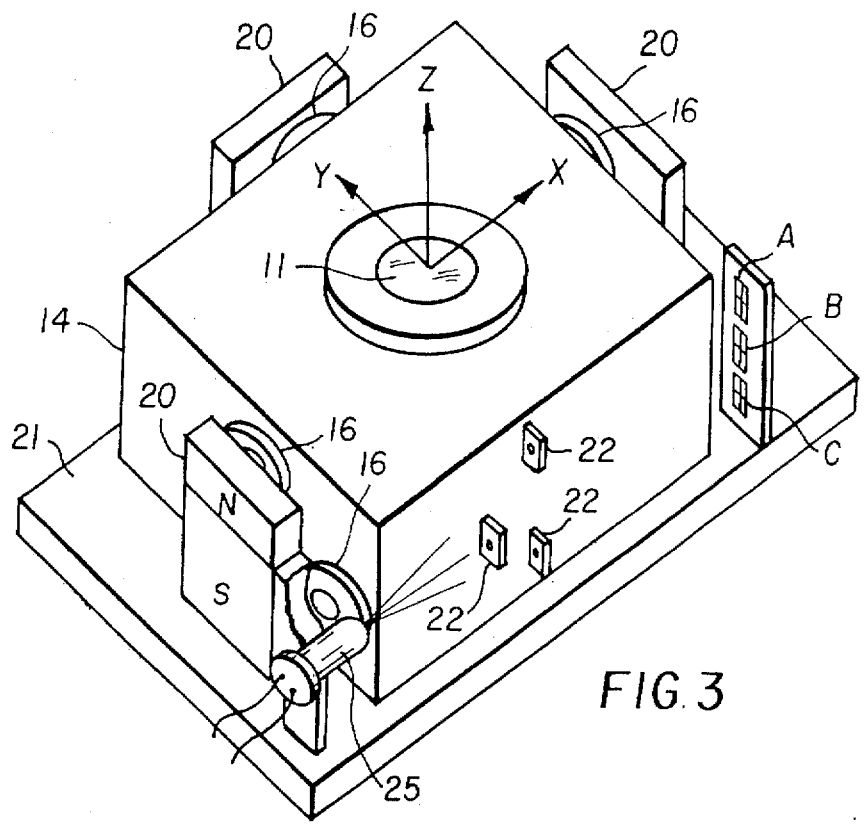
FIG. 3 is a view similar to FIG. 1, but showing three quad photosensitive detectors in accordance with the present invention.

Turning now to FIG. 3 where parts correspond to those in FIG. 1, the same numbers will be used. Light from an LED 25 passes through three apertures 22 and illuminates three quad photosensitive detectors A, B, and C. The information extracted from the detectors A, B, and C is used to calculate the motion of the lens holder 14 and, of course, its objective lens 11 in all six degrees of freedom relative to the base 21. For a more complete description of the quad photosensitive detectors A, B, and C, see commonly-assigned U.S. patent application Ser. No. 08/660,568 filed Jun. 7, 1996 to Marino et al entitled "Position Sensing for an Optical Recording Actuator."

FIG. 4 shows the control system 27 for this actuator. The use of actuator position data in six orthogonal coordinates (X, Y, Z, θx, θy, θz) and the ability of this control system 27 to accept servo control commands in the same coordinate system is an important feature of this invention. This permits the otherwise complex six-input, six-output servo, to be replaced by six simple single input, single output servos.

Figure 5A:
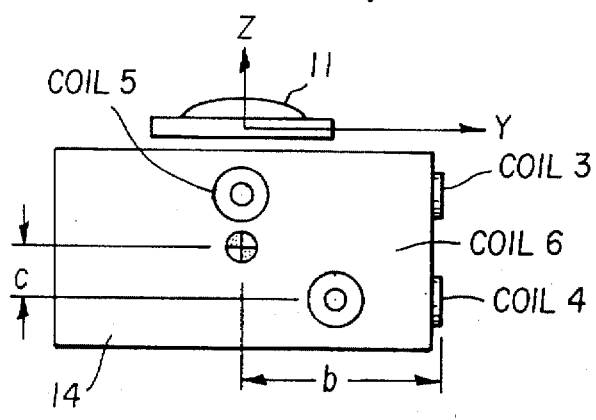
FIGS. 5A–5C schematically depict six coils mounted on the lens holder and depicting critical dimensions which are used in a matrix of the control system of FIG. 4.
Figure 5B:
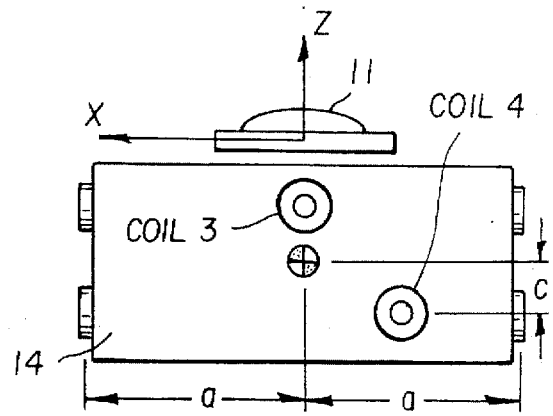
Figure 5C:
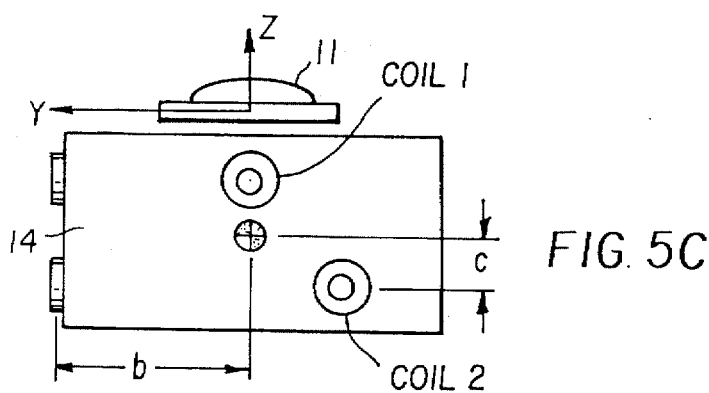

The input to a sensor data processor 28 is from the quad photosensitive detectors A, B, and C. The sensor data processor 28 digitizes the input signals and converts them into six degrees of freedom position signals. An actuator servo controller 30 receives position signals X, θx, and θz position signals whereas a system controller 32 receives position signals Y and Z. The system controller 32, in response to the position signals Y and Z, produces a signal input to the actuator servo controller 30 which represents whether or not the control system 27 is performing within its range of operation. Although this arrangement is preferred, it will be understood that the system can operate without the system controller 32. Also provided as inputs to the actuator servo controller 30 are conventional tracking error signals and focus error signal which, as well understood in the art, are provided from analyzing a beam of light which passes through the objective lens 11 and is reflected off back of an optical disk being recorded. This operation is so well understood in the art that it need not be described here. The actuator servo controller 30 is conventional and produces six command signals which represent the desired motion in the six degrees of freedom, namely, X, Y, Z, θx, θy, and θz. Finally, a coordinate conversion processor 34 provides signals to six coil current amplifiers 36a–36f. Each coil amplifier corresponds to a single planar magnetic coil 16 which corresponds to a single degree of freedom of motion. The coordinate conversion processor 34 operates by performing a mathematical conversion (matrix multiplication) which converts the six input signals or commands into six signals which are applied to the coil current amplifiers 36a–36f. It will be understood that other configurations can also be used which use more than six coils. The matrix used in this embodiment will shortly be described. However, before it is described, reference should be made to FIGS. 5A–5C which schematically depict six coils mounted on the lens holder 14 and depicting critical dimensions which are used in the matrix. As shown in FIG. 5A, two planar magnetic coils 16 are those mounted on one face of the lens holder 14 whereas FIGS. 5B and 5C shows that four coils are mounted on two other faces of the lens holder 14. A projection of the center of mass 40 on each of the three faces of the lens holder 14 is shown. As shown in FIG. 5A, critical dimensions C is from the center of one of the coils to the projected center of mass 40, whereas critical dimension B is from the center of a coil looking at its side view to the projected center of mass 40. Other critical dimensions a are shown in FIG. 5B, whereas in FIG. 5C, the dimensions b and c remain the same as in FIG. 5A. The matrix itself is as follows:

$$\begin{bmatrix} \frac{-1}{2} \cdot \frac{c}{a} & \frac{-1}{2} \cdot \frac{c}{b} & \frac{1}{2} & \frac{-1}{(2 \cdot b)} & \frac{1}{(2 \cdot a)} & 0 \\ \frac{-1}{2} \cdot \frac{b}{a} & \frac{1}{2} & 0 & 0 & 0 & \frac{-1}{(2 \cdot a)} \\ 0 & \frac{c}{b} & 0 & \frac{1}{b} & 0 & 0 \\ 1 & 0 & 0 & 0 & 0 & 0 \\ \frac{1}{2} \cdot \frac{c}{a} & \frac{-1}{2} \cdot \frac{c}{b} & \frac{1}{2} & \frac{-1}{(2 \cdot b)} & \frac{-1}{(2 \cdot a)} & 0 \\ \frac{1}{2} \cdot \frac{b}{a} & \frac{1}{2} & 0 & 0 & 0 & \frac{1}{(2 \cdot a)} \end{bmatrix}$$

As an alternative, the critical dimensions on each of the three faces of the lens mount need not be equal. In this case, there will be as many as six unique critical dimensions. These dimensions would then appear in the matrix calculation. The matrix is used to calculate a six-dimensional vector of the coil currents necessary to achieve the desired actuator motion. The servo commands X, Y, Z, θx, θy, and θz produced by the actuator servo controller 30 are premultiplied by the matrix to produce the input signals to the coil amplifiers 36a–36f.

Reviewing the operation of FIG. 4, input signals from the quad sensor A, B, and C and tracking error and focus error signals are used to provide servo commands X, Y, Z, θx, θy, and θz. Coordinate conversion processor 34 operates upon these command signals to provide control signals for each current amplifier 36a–36f. The coil current amplifiers, in turn, each control the planar magnetic coil 16.

Alternatively, the required four additional measurements could be made using a plurality of simple optoelectronic sensors each consisting of a light emitting diode and a photosensitive bi-cell. This type of sensor is commonly used in actuators to sense tracking position. A minimum of four of these sensors would be required, as each sensor provides information about a single degree of freedom.

The invention has been described with reference to a preferred embodiment. However, it will be appreciated that variations and modifications can be effected by a person of ordinary skill in the art without departing from the scope of the invention.

| Parts List: | |
|---|---|
| A, B, C | quad photosensitive detectors |
| 10 | optical actuator |
| 11 | objective lens |
| 14 | lens holder |
| 16 | planar magnetic coils |
| 20 | magnetic assemblies |
| 21 | base |
| 22 | apertures |
| 25 | LED |
| 27 | control system |
| 28 | sensor data processor |
| 30 | actuator servo controller |
| 32 | system controller |
| 34 | coordinate conversion processor |
| 36a | coil current amplifiers |
| 36b | coil current amplifiers |
| 36c | coil current amplifiers |
| 36d | coil current amplifiers |
| 36e | coil current amplifiers |
| 36f | coil current amplifiers |
| 40 | center of mass |

We claim:

1. An optical actuator comprising:

a) a base;

b) a moveable lens holder including an objective lens and positioned relative to the base;

c) at least six planar magnetic coils and a plurality of magnetic assemblies arranged to be associated with the coils, each of the assemblies including magnetic means with two or more poles fixed to the actuator base, the coils and the magnetic assemblies being mounted relative to each other on the lens holder and the base;

d) means for applying signals to the coils to induce magnetic fields in the coils for positioning the lens holder;

e) detector means for providing signals representing the four degrees of freedom of positions of the lens holder with respect to the base; and f) computation means responsive to the detector means signals for determining the coil signals for positioning the moveable lens holder in six degrees of freedom of motion relative to the base.

2. The optical actuator of claim 1 wherein the planar magnetic coils are mounted on the lens holder and the magnetic assemblies are mounted on the base.

3. The optical actuator of claim 1 wherein the planar magnetic coils are mounted on the base and the magnetic assemblies are mounted on the lens holder.

4. The optical actuator of claim 1 wherein the magnetic means includes three magnets associated with two separate coils.

5. The optical actuator of claim 1 further including means for producing tracking error and focus error signals and wherein the computation means is further responsive to the signals for providing coil signals to control six degrees of freedom of motion of the lens holder.

6. The optical actuator of claim 1 wherein the detector means includes:

i) a detector assembly including mounted on the base a light source and three photosensitive quad detectors and mounted on the moveable lens holder, means defining three separate apertures, each corresponding to a detector and arranged so that light from the source passes through the apertures and illuminates its corresponding detector mounted on the base, each detector having associated means for providing position detection in two orthogonal directions; and ii) means responsive to the position detection means to determine the position of the moveable lens holder with respect to the base in six degrees of freedom of motion.

* * * * *